United States Patent [19]

Nemoto

[11] Patent Number: 4,555,141
[45] Date of Patent: Nov. 26, 1985

[54] VEHICLE SEAT

[75] Inventor: Akira Nemoto, Tokyo, Japan

[73] Assignee: Tachikawa Spring Co. Ltd., Japan

[21] Appl. No.: 520,644

[22] Filed: Aug. 5, 1983

[51] Int. Cl.$^4$ .............................................. A47C 7/02
[52] U.S. Cl. .............................. 297/452; 297/DIG. 1
[58] Field of Search ................. 297/DIG. 1, 452, 455, 297/DIG. 2

[56]  References Cited

U.S. PATENT DOCUMENTS

| | | | |
|---|---|---|---|
| 3,208,085 | 9/1965 | Grimshaw | 297/DIG. 1 |
| 3,252,735 | 5/1966 | Smith, Jr. | 297/DIG. 1 |
| 3,529,866 | 9/1970 | Getz | 297/452 |
| 3,604,748 | 9/1971 | Lamkemeyer | 297/DIG. 1 |
| 3,639,002 | 2/1977 | Tischler | 297/DIG. 1 |
| 3,756,653 | 9/1973 | Worley | 297/DIG. 1 |
| 3,844,614 | 10/1974 | Babbs | 297/452 |
| 4,042,663 | 8/1972 | Harder, Jr. | 297/DIG. 1 |
| 4,408,797 | 10/1983 | Franck et al. | 297/452 |

Primary Examiner—Francis K. Zugel
Attorney, Agent, or Firm—Cushman, Darby & Cushman

[57] ABSTRACT

A vehicle seat is disclosed which includes a pan-type frame, a pad formed of a foam material, and a top layer adapted to cover the surface of said pad and also to fix said pad to said frame, while the end of said top layer is secured to the frame simultaneously with the formation of said pad. Accordingly, the conventional fixing step of fixing the top layer end to the frame by means of hogged rings or the like is not necessary, which results in a simplified and positive fixation of the top layer end. In other words, the following conventional steps can be eliminated: forming a frame in a pan structure; causing a foam material to foam within a metal mold having a predetermined configuration to form a pad in order to obtain a structure corresponding to that of the associated seat; and placing a top layer over the pad to be secured to the frame. With the invention, the top layer can be integrally secured to the frame by means of a foam material for forming a pad.

11 Claims, 4 Drawing Figures

VEHICLE SEAT

BACKGROUND OF THE INVENTION

1. Field of the Invention

The present invention relates to a vehicle seat, and more particularly to an automobile seat in which a top layer, a pan-type frame and a pad are formed integrally and which has an improved structure for fixing the top layer and the frame one to another.

2. Description of the Prior Art

Conventionally, an automobile seat is manufactured by placing, over a frame, a pad that is previously formed in a predetermined shape, covering the pad with a top layer, and then fixing the top layer to the frame by means of adhesion, hogged ring connection, or molding.

Accordingly, the conventional process for manufacturing automobile seats requires much time and labor resulting products of varying quality due to its required manual construction. Also, in such prior art method, many components are necessary to manufacture a seat thereby making it difficult to stock all component prior to use. In order to overcome such drawbacks, it has been proposed recently to provide a seat which is manufactured by first placing a foam material foamed correspondingly to the shape of the seat as a pad over a pan-type frame which employs no spring members, and then covering the pad with a top layer to secure the top layer to the pan-type frame integrally, so that the total weight of the seat is reduced.

However, even the last-mentioned method still requires much labor and time to manufacture a seat as well as being complicated, since it is necessary that first a frame is formed in a pan-type configuration; then, a pad is formed by causing a foaming material to be foamed within a metal mold having a predetermined shape so as to provide a shape corresponding to that of the seat; and, finally the pad is covered with a top layer so as to fix it to the frame.

SUMMARY OF THE INVENTION

Accordingly, the present invention aims at providing a seat which can eliminate the above mentioned drawbacks present in the prior art and also in which a top layer is integrally fixed to a pan-type frame at the same time when a pad is formed.

According to the present invention, the edges of the top layer can be firmly secured and thus the top layer will never peel off at the edges during a long period of use of the seat.

Upon further study of the specification and appended claims, further objects, features and advantages of the present invention will become more fully apparent to those who are skilled in the art to which the invention pertains.

In brief, the above and other objects, features and advantages of the present invention are attained by providing a portion for inserting the end of the top layer in the periphery of a pan-type frame, forming a plurality of small bores in said insertion portion of the top layer, causing a foam material to foam and fill in clearances between said frame and said top layer and at the same time to penetrate into said top layer insertion portion through said small bores so as to adhere and fix said end of the top layer to said frame.

According to the invention, as described above, the top layer can be secured to the pad and the frame at the same time when the pad is formed, and a connecting step using hogged-rings or the like, which is involved in the conventional seat manufacturing method, can be eliminated, thereby simplifying the manufacturing process and reducing the cost of the seat.

Although in connection with the frame structure two embodiments of the invention are disclosed in this specification, it is clear that the invention is not limited to these two embodiments, but that various kinds of modifications are possible within the scope of the invention.

DETAILED DESCRIPTION OF THE INVENTION

Figure 1:
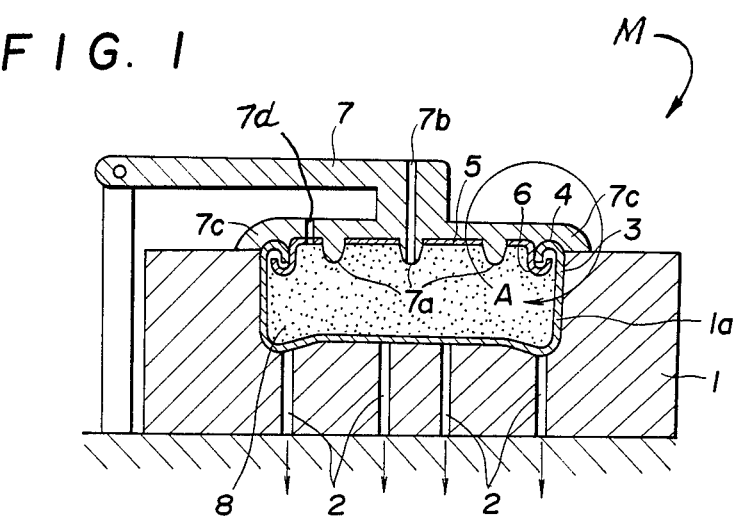
FIG. 1 is a sectional side view illustrating the manufacture of seat according to the invention.

Referring now to the drawings, FIG. 1 shows a metal mold (M) for forming a seat according to the present invention. A lower mold (1) is provided with a recessed portion (1a) having a shape corresponding to that of the seat and a plurality of vent passages (2) adapted to vent out air from within the recessed portion (1a) of the mold. Within the recessed portion (1a) there is positioned a top layer (3), which is formed in a predetermined shape conforming to the shape of the recess (1a) by means of air discharge through the passages (2). The top layer may however be pre-formed in a shape corresponding to that of the seat before it is inserted into the recessed portion of the mold.

Figure 2:
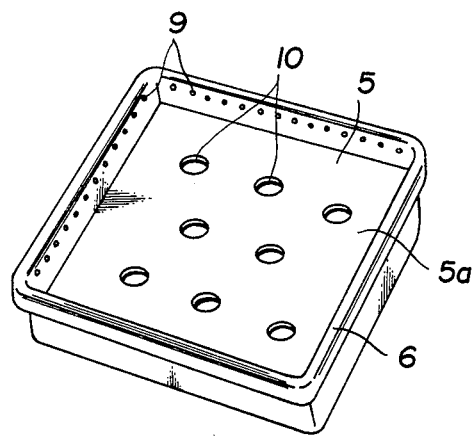
FIG. 2 is a perspective view of a pan-type frame used in the seat of the present invention.

A pan-type frame (5) is then positioned over the mold recessed portion (1a) along the inner peripheral surface of which the top layer (3) has been engaged. Frame (5), as shown perspectively in FIG. 2, is pressed-formed of a metal or a synthetic resin to provide a pan-type structure and is provided at its periphery with a top layer end insertion portion (6) having a U-shaped folded portion. Along the periphery of the insertion portion (6) there are provided a plurality of small bores (9). Similarly, a plurality of holes (10) are also provided in the flat portion (5a) of the frame (5). The peripheral end portion (3a) of the top layer (3) is folded into the U-shaped insertion portion (6). More particularly, a portion of the insertion portion (6) at the periphery of the frame (5), and thus the tip end of the peripheral end portion (3a) is inserted into the insertion portion (6), as shown in an enlarged views of FIGS. 3 and 4.

Figure 3:
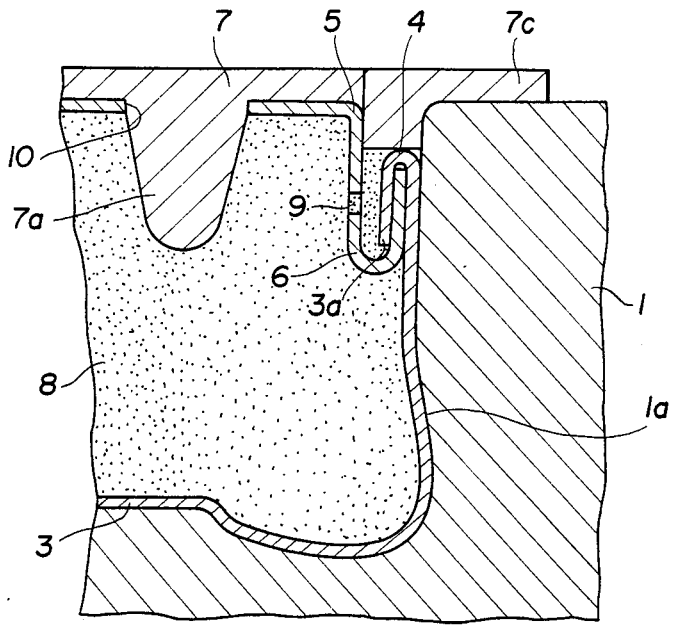
FIG. 3 is an enlarged sectional view of a portion designated by A in FIG. 1; and, FIG. 4 is an enlarged sectional view, similar to FIG. 3 of an alternate embodiment of the invention.

A fitting member (7) is provided and is adapted to push against and thus hold the frame (5). Fitting member (7) includes projections (7a) to be inserted through respective ones of the holes (10) in the flat portion (5a) of the frame (5). With the projection (7a) inserted into holes (10), the frame (5) will thus be supported against the fitting member (7). Fitting member (7) also includes a venting recess (7d) for venting the pad being formed by means of foaming of a foam material (8). The projection (7a) located at a central position may be provided with a passage (7b) for introducing a foam material (8) into the recess (1a) of the lower mold. A periphery holding portion (7c) for pushing the peripheral end folded portion (4) of the top layer (3) is preferably formed integrally with the fitting member (7), or, as shown in FIG. 3, may be provided separately from the fitting member (7).

In the above described arrangement, the top layer (3) is inserted into the recessed portion (1a) of the lower metal mold (1) and air is vented out through the air vent passages (2) as necessary, so that the top layer (3) is brought into close contact with the inner peripheral surface of the mold recessed portion (1a). With this state being maintained, the pan-type frame (5) forming an upper metal mold is positioned over the recessed portion (1a) of the lower metal mold by supporting it by the fitting member (7), the peripheral end portion (3a) of the top layer (3) is then folded and inserted into the U-shaped insertion portion (6), the fitting member (7) and the periphery holding portion (7c) are closed, and the air is further vented out by means of vent (7d). Thereafter, a foam material (8), such as urethane, is poured through the passage (7b) of the fitting member (7) and is caused to foam in the hollow portion between the top layer (3) and the frame (5), so that a pad is formed in a predetermined shape. During this process, the foam material also penetrates into the insertion portion (6) through the small bores (9) of said insertion portion and serves to adhere the top layer (3) to the frame (5) firmly and simultaneously during foaming of material (8).

Thus, according to the present invention, when the foam material (8) is caused to foam, the formation of the pad and the adhesion of the top layer (3) to the frame (5) are accomplished simultaneously.

Figure 4:
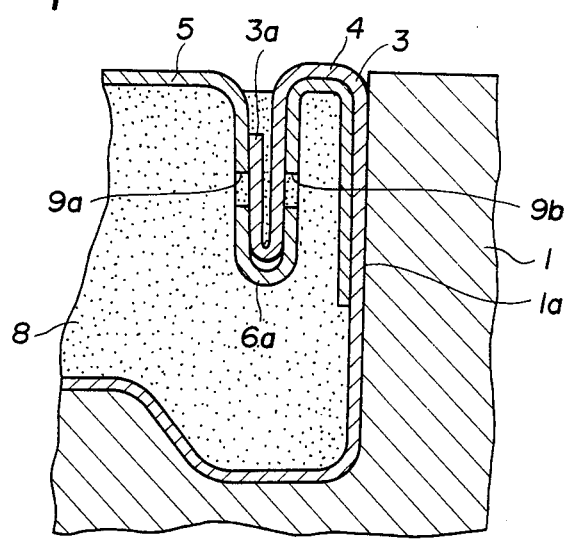

FIG. 4 is an enlarged sectional side view of a peripheral portion of a pan-type frame, illustrating an alternate embodiment of the present invention.

In the embodiment of FIG. 4, an insertion portion (6a) having a U-shaped configuration is provided in the periphery of a frame (5), a plurality of small bores (9a) (9b) are formed at both sides of the insertion portion (6a) in a parallel relation, and the frame (5) is supported by a fitting member (not shown). Also, the peripheral end (3a) of the top layer (3), which has been already fitted into the recessed portion (1a) of a lower metal mold, is folded back in a U-shaped form and is inserted into the insertion portion (6a). When a pad is formed of a foam material (8) between the top layer (3) and the frame (5), a part of the foam material penetrates into the insertion portion (6a) by means of the opposing small bores (9a) (9b) defined at both sides of portion (6a), so that it serves to adhere and thus fix the top layer (3) to the frame (5).

Although two embodiments of the invention have been disclosed herein, it is apparent, of course, that these two embodiments are only examples of the invention and various modifications and changes of the components thereof can be made without departing from the spirit and the scope of the invention as hereinafter claimed. For example, the frame may be manufactured by providing a plate-type frame body and welding U-shaped drawn fitting members to the four leg portions of the frame.

As can be seen from the foregoing description of the preferred embodiments of the invention, the present invention can eliminate a step necessary in the prior art process which includes placing a pad over a frame, covering the pad with a top layer, and connecting the top layer to the frame and the pad by means of hogged rings or the like. Also, with the invention, the top layer can be adhered and fixed to the frame simultaneously with the formation of the pad, and thus the manufacturing process is simplified, resulting in the reduced cost.

What is claimed is:

1. A vehicle seat comprising:
   a frame including a bottom wall and a peripheral wall integral with said bottom wall, said peripheral wall including means defining an exterior recessed insertion portion adjacent said peripheral wall;
   a top layer having its peripheral edge inserted into said exterior recessed insertion portion, said top layer also defining, together with said interior area of said frame, an interior pad space;
   said peripheral wall also including means defining plural apertures to establish communication between said interior pad space and said exterior recessed insertion portion; and
   a foamed pad disposed in said interior pad space between said frame and said top layer, portions of said pad in the vicinity of said peripheral wall extending through said apertures defined therein and into said exterior recessed insertion portion, said pad portions extending into said recessed insertion portion also being in contact with said top layer peripheral edge to secure said top layer to said frame.

2. A vehicle seat as in claim 1 wherein said means defining an exterior recessed insertion portion includes an outwardly and upwardly folded U-shaped portion integral with said peripheral wall.

3. A vehicle seat as in claim 2 wherein said U-shaped portion includes a second U-shaped portion outwardly and downwardly folded relative to said first-mentioned U-shaped portion, said second U-shaped portion defining an outer region of said pad space peripherally of a central region thereof.

4. A vehicle seat as in claim 3 wherein said peripheral edge of said top layer is inserted into said insertion portion defined by said first-mentioned U-shaped portion, and wherein said means defining apertures defines first and second opposing sets of apertures in said first-mentioned U-shaped portion, said first set establishing communication between said central region of a said pad space and said insertion portion and said second set establishing communication between said outer region of said pad space and said insertion portion, wherein said foamed material in the vicinity of said first and second sets of apertures extends into said insertion portion to secure said top layer to said frame.

5. A vehicle seat as in claim 1 herein said peripheral edge of said top layer is a folded region inserted into said insertion portion.

6. A method of manufacturing a vehicle seat comprising the steps of:
   (a) locating a top layer within a recess formed in a mold, the recess having a shape corresponding to that of said seat,
   (b) placing a pan-type frame to cover the recess;
   (c) inserting a peripheral end portion of said top layer into a groove-shaped insertion portion provided along the peripheral edges of said frame; and
   (d) thereafter introducing a foamable material into a hollow portion defined between said top layer and said frame and then causing the foamable material to foam so as to form a pad, while simultaneously allowing said foamable material to penetrate into said insertion portion through a plurality of apertures formed in said insertion portion so as to secure integrally said top layer, said frame and said pad one to another.

7. The method as recited in claim 6, wherein in said recess defined in said mold includes an air vent passage, and wherein said method further comprises a step of discharging air from said recess in which said top layer has been located by means of said air vent passage to closely conform the top layer along said seat-shaped recess.

8. The method as recited in claim 6 further including th steps of:
   (e) inserting a projection of a fitting member into a hole provided in a flat portion of said frame and exerting a holding force thereagainst; and
   (f) introducing said foamable material into the mold and also into said through a passage formed in said projection so as to form said pad while simultaneously allowing said foamable material to secure said top layer end to portion said frame.

9. The method as recited in claim 8 further including a step of holding, by means of a periphery holding portion associated with said said fitting member, said top layer end portion against displacement.

10. A method of forming a vehicle seat comprising the steps of:
   (a) providing a lower mold having a recess formed therein to the desired shape of the seat;
   (b) introducing a top layer into said recess;
   (c) covering said recess with said top layer therein with a pan-type frame of the type having an exterior insertion portion and plural apertures establishing communication between the interior of the frame and said insertion portion, said top layer and frame thus establishing a pad space;
   (d) inserting the peripheral edges of said top layer into said insertion portion; and then
   (e) introducing a foamable material into said pad space and allowing said foamable material to foam therein while allowing said foamable material to enter into said insertion portion through said plural apertures to simultaneously secure said top layer to said frame along said insertion portion during formation of said pad.

11. A method as in claim 10 wherein step (e) is practiced by the steps of:
   (i) providing a top member to push against said frame, said top member including a projection member which extends into said pad space through a hole formed in said frame in registry therewith, wherein
   (ii) said foamable material is introduced into said pad space via a passageway formed in said projection member.

* * * * *